United States Patent
Sawai et al.

(10) Patent No.: US 6,784,220 B2
(45) Date of Patent: Aug. 31, 2004

(54) POLYURETHANE FOAM

(75) Inventors: Minoru Sawai, Wakayama (JP); Hiroshi Kitagawa, Wakayama (JP)

(73) Assignee: Kao Corporation, Tokyo (JP)

( * ) Notice: Subject to any disclaimer, the term of this patent is extended or adjusted under 35 U.S.C. 154(b) by 13 days.

(21) Appl. No.: 09/859,419

(22) Filed: May 18, 2001

(65) Prior Publication Data

US 2002/0013378 A1 Jan. 31, 2002

(30) Foreign Application Priority Data

May 19, 2000 (JP) .................................... 2000-147239

(51) Int. Cl.$^7$ .............................................. C08G 18/28
(52) U.S. Cl. ..................... 521/170; 521/129; 521/172; 521/173; 521/174
(58) Field of Search ................................ 521/170, 172, 521/173, 174, 129

(56) References Cited

U.S. PATENT DOCUMENTS 6,271,279 B1 * 8/2001 Nodelman et al. .......... 521/159

FOREIGN PATENT DOCUMENTS

| JP | A7179556 | 7/1995 |
| JP | A7179557 | 7/1995 |
| JP | A7271263 | 10/1995 |

* cited by examiner

Primary Examiner—John M. Cooney, Jr.
(74) Attorney, Agent, or Firm—Birch, Stewart, Kolasch & Birch, LLP

(57) ABSTRACT

A process for preparing a polyurethane foam, comprising reacting a polyol having a number-average molecular weight of not less than 1000 and less than 2500 with a polyisocyante compound in the presence of a catalyst and a blowing agent in a mold, to give a molded article having a density of 0.4 to 0.8 g/cm$^3$, and heating the resulting molded article to a temperature of 60° to 100° C. The polyurethane foam is used as a cushioning material such as shoe soles of sports shoes.

11 Claims, No Drawings

POLYURETHANE FOAM

BACKGROUND OF THE INVENTION

1. Field of the Invention

The present invention relates to a polyurethane foam. More specifically, the present invention relates to a polyurethane foam, a process for preparing the polyurethane foam, and its uses, for example, cushioning materials such as shoe soles.

2. Discussion of the Related Art

When a polyurethane foam is used as a cushioning material for shoe soles of sports shoes, its compression set as defined in ASTM D 395 is important. Therefore, it has been desired to meet the requirement of both compression set and strength. However, it is actually difficult to meet the above requirement For instance, if the crosslinking density of a polyurethane foam is increased in order to improve the strength, the compression set is, on the other hand, lowered.

Japanese Patent Laid-Open No. Hei 7-179556 discloses a process for preparing a thermoplastic polyurethane having a high hardness of not less than 75 (JIS-A hardness), excellent heat resistance, low compression permanent strain and excellent cold resistance, comprising reacting a polyester-polyol having a moleculer weight of 2500 to 3500 and 1,4-butanediol with a diisocyanate in a specific ratio. However, there arises some defects in this process that the thermoplastic polyurethane is poor in heat resistance, compression permanent strain and cold resistance, when the molded article density is adjusted to a desired range of 0.4 to 0.8 g/cm$^3$, and Asker C hardness is adjusted to 50 to 75.

Japanese Patent Laid-Open No. Hei 7-179557 discloses a process for preparing a thermoplastic polyurethane which is excellent in moldability and has good heat resistance and cold resistance, comprising 1,9-nonanediol and 3-methyl-1, 5-pentanediol as essential components for specific polyester diols. However, this polyurethane has some defects in that the polyurethane foam is poor in heat resistance, compression permanent strain and cold resistance, when the molded article density is adjusted to a desired range of 0.4 to 0.8 g/cm$^3$, and Asker C hardness is adjusted to 50 to 75.

Also, Japanese Patent Laid-Open No. Hei 7-271263 discloses a process for preparing a cleaning blade comprising a thermoplastic polyurethane elastomer. This method is characterized in that heat treatment is carried out at a temperature of 60° to 100° C. for 8 to 16 hours to give a hardness of 50 to 80 (JIS-A). According to the method, a cleaning blade having a compression set (compression permanent strain) of not more than 30% is obtained. However, this cleaning blade has some defects in that the cleaning blade is poor in heat resistance, compression permanent strain and cold resistance, when the molded article density is adjusted to a desired range of 0.4 to 0.8 g/cm$^3$, and Asker C hardness is adjusted to 50 to 75.

An object of the present invention is to provide a polyurethane foam having a high strength within a specific molded article density range and being excellent in compression set, which can be suitably used as cushioning materials such as shoe soles of sports shoes.

These and other objects of the present invention will be apparent from the following description.

SUMMARY OF THE INVENTION

According to the present invention, there is provided a process for preparing a polyurethane foam, comprising:

reacting a polyol having a number-average molecular weight of not less than 1000 and less than 2500 with a polyisocyanate compound in the presence of a catalyst and a blowing agent in a mold, to give a molded article having a density of 0.4 to 0.8 g/cm$^3$, and heating the resulting molded article to a temperature of 60° to 100° C.

Further, there are provided a polyurethane foam obtained by the above-described process and its applications.

DETAILED DESCRIPTION OF THE INVENTION

The polyol has a number-average molecular weight of not less than 1000 and less than 2500, preferably 1000 to 2400, from the viewpoints of maintaining its appropriate viscosity and improving operability and from the viewpoint of maintaining the strength of a polyurethane foam.

The polyol includes polyester-polyols, polyether-polyols and the like. Among them, the polyester-polyols are preferable from the viewpoint of satisfying both strength and compression set.

The dicarboxylic acid constituting the polyester-polyol includes, for instance, saturated aliphatic dicarboxylic acids such as glutaric acid, adipic acid, pimelic acid, suberic acid, azelaic acid and sebacic acid; saturated alicyclic dicarboxylic acids such as cyclohexanedicarboxylic acid; aromatic dicarboxylic acids such as phthalic acid, terephthalic acid and isophthalic acid; unsaturated aliphatic dicarboxylic acids such as maleic acid, fumaric acid and itaconic acid; halogen-containing dicarboxylic acids such as tetrabromophthalic acid; ester-formable derivatives thereof; acid anhydrides thereof; and the like. These dicarboxylic acids can be used alone or in admixture of two or more kinds. The dicarboxylic acid may contain a polybasic acid having not less than three functional groups such as trimellitic acid or pyromellitic acid if necessary.

The diol constituting the polyester-polyol includes, for instance, ethylene glycol diethylene glycol, propylene glycol, 1,4-butanediol, 1,5-pentanediol, methylpentanediol, 1,6-hexanediol, trimethylolpropane, glycerol, pentaerythiritol diglycerol, dextrose, sorbitol, and the like. These diols can be used alone or in admixture of two or more kinds.

Representative examples of the polyether-polyol are polyoxypropylene-polyol (hereinafter referred to as "PPG"), polyoxytetramethylene glycol (hereinafter referred to as "PTMG"), and mixtures thereof.

The PPG can be prepared by a process comprising subjecting a compound having at least two active hydrogens as a starting material to a usual ring-opening addition reaction of an alkylene oxide, and further adding ethylene oxide in a block form to the molecular terminal of the resulting compound.

The compound having at least two active hydrogens includes, for instance, polyhydric alcohols, polyhydric phenols, polyamines, alkanolamines, and the like. Concrete examples of the compound having at least two active hydrogens include ethylene glycol diethylene glycol, propylene glycol, dipropylene glycol, neopentyl glycol, 1,4-butanediol, 1,6-hexanediol, glycerol, trimethylolpropane, pentaerythritol, diglycerol, dextrose, sucrose, bisphenol A, ethylenediamine, and modified products thereof, and the like. These compounds can be used alone or in admixture of two or more kinds.

The alkylene oxide includes, for instance, ethylene oxide, propylene oxide, 1,2-butylene oxide, 2,3-butylene oxide, styrene oxide, and the like.

Among the polyol components, the polyol components comprising 90 to 95% by weight of a polyester-polyol having two functional groups and a number-average molecular weight of 1000 to 2400, and 5 to 10% by weight of a polyester-polyol having a number-average molecular weight of not less than 2000 and less than 2500 are preferable, from the viewpoints of viscosity during the preparation of the molded article, and strength, compression set and demoldability after molding.

The polyisocyanate compound includes aromatic, alicyclic and aliphatic polyisocyanates having at least two isocyanate groups, mixtures thereof, and modified polyisocyanates obtained by modifying these polyisocyanate compounds. Concrete examples of the polyisocyanate compound include aromatic polyisocyanates such as tolylene diisocyanate, methylenediphenyl diisocyanate, naphthylene diisocyanate, xylylene diisocyanate and polymethylenepolyphenylene diisocyanate; alicyclic polyisocyanates such as hydrogenated methylenediphenyl diisocyanate, hydrogenated tolylene diisocyanate and isophorone diisocyanate; aliphatic polyisocyanates such as hexamethylene diisocyanate and lysine diisocyanate; mixtures thereof; modified products thereof; and the like. The modified products include, for instance, prepolymer-modified products, which are reaction products of the polyisocyanate with the polyol, nurate-modified products, urea-modified products, carbodiimide-modified products, arophanate-modified products, burette-modified products, and the like.

The catalyst includes, for instance, tertiary amines such as 1,4-diazabicyclo[2.2.2]octane (hereinafter referred to as TEDA), N,N,N',N'-tetramethylhexamethylenediamine, N,N,N',N'-tetramethylpropylenediamine, N,N,N',N',N''-pentamethyldiethylenetriamine, trimethylaminoethylpiperazine, N,N-dimethylcyclohexylamine, N,N-dimethylbenzylamine, N-methylmorpholine, N-ethylmorpholine, triethylamine, tributylamine, bis(dimethylaminoalkyl)piperazines, N,N,N',N'-tetramethylethylenediamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimethylimidazole and 2-methylimidazole; organometal compounds such as dibutyltin dilaurate, stannous oleate, cobalt naphthenate and lead naphthenate; and the like. These catalysts can be used alone or in admixture of two or more kinds.

It is desired that the amount of the catalyst is not less than 0.3 parts [parts by weight, hereinafter referred to the same], preferably not less than 0.5 parts, from the viewpoint of demoldability, and not more than 2.0 parts, preferably not more than 1.6 parts, from the viewpoints of filling ability and moldability, based on 100 parts of the polyol component.

The blowing agent includes water, low-boiling point hydrocarbon compounds, chlorofluorocarbons, hydrogenated fluorocarbons, and the like. These blowing agents can be used alone, or in admixture of two or more kinds. Among them, water is preferable. It is desired that the amount of the blowing agent is 0.1 to 1.5 parts, preferably 0.2 to 1.0 part, based on 100 parts of the polyol component, from the viewpoint of lowering the density of a molded article, and from the viewpoints of reaction balance between gelling and blowing, and moldability.

In the present invention, auxiliaries such as surfactants, crosslinking agents, pigments, antioxidants and yellowing preventives can be employed in proper amounts as occasion demands.

The surfactants include, for example, silicone surfactants such as polyalkylsiloxane, polyoxyalkylene polyol-modified dimethylpolysiloxane and alkylene glycol-modified dimethylpolysiloxane; and anionic surfactants such as salts of fatty acids, salts of sulfuric acid esters, salts of phosphoric acid esters and sulfonates.

The crosslinking agent includes low-molecular compounds having at least two groups selected from the group consisting of hydroxyl group, primary amino group, secondary amino group, and other active hydrogen-containing groups which are reactive with isocyanate group.

Concrete examples of the crosslinking agent include polyhydric alcohols such as ethylene glycol, diethylene glycol, propylene glycol, dipropylene glycol, 1,4-butanediol, 1,6-hexanediol, neopentyl glycol, glycerol, trimethylolpropane, triethanolamine oxide adducts of bisphenol A; polyamines such as diethyltoluenediamine, chlorodiaminobenzene, ethylenediamine and 1,6-hexanediamine; and the like, without intending to limit the present invention to those exemplified ones. These crosslinking agents can be used alone or in admixture of two or more kinds. Among them, 1,4-butanediol and ethylene glycol are preferable.

A process for preparing a polyurethane foam includes, for instance, a process comprising previously mixing a polyol, a catalyst, a blowing agent, an auxiliary, and the like with stirring to give a polyol solution; mixing the polyol solution with a polyisocyanate compound with stirring in a molding machine; and injecting the resulting mixture into a mold to foam. More specifically, for example, the polyurethane foam can be prepared by mixing the polyol solution with stirring using a tank or the like, controlling the temperature of the polyol solution usually to 35° to 45° C., and reacting the polyol solution with the polyisocyanate compound using a foaming machine such as an automatically mixing and injecting foaming machine or an automatically blending and injecting foaming machine to foam.

It is desired that the ratio of the polyol to the polyisocyanate compound is adjusted to an isocyanate index of 90 to 110, more preferably 95 to 105, especially preferably 99 to 101, from the viewpoints of improvements in strength and flexural resistance.

The density of a molded article is controlled to 0.4 to 0.8 g/cm$^3$, preferably 0.5 to 0.7 g/cm$^3$, from the viewpoints of maintaining the strength and improving compression set of a polyurethane foam, when the molded article is used as a cushioning material for shoe soles. The density of the molded article can be controlled by regulating the amounts of the blowing agent and the catalyst.

When the molded article is used as a cushioning material for shoe soles, it is preferable that the hardness of the molded article is controlled to 50 to 75 (Asker C), preferably 55 to 70 (Asker C), from the viewpoints of maintaining the strength and improving compression set of a polyurethane foam. The hardness of the molded article can be controlled by adjusting the amount of the crosslinking agent.

Next, the resulting molded article is heated to a temperature of 60° to 100° C. One of the great features in the present invention resides in that the molded article is heated as described above. When the molded article is heated to a specified temperature, high tensile strength and high tear strength are imparted to the molded articles, and moreover the compression set is also improved.

It is preferable that the heating is carried out after the molded article is demolded from a mold, from the viewpoint of improvement in the productivity.

It is preferable that the heating is carried out within a period of about two weeks just after demolding of the molded article from the mold, from the viewpoint of stabilizing physical properties such as compression set.

The heating temperature is 60° to 100° C., preferably 80° to 100° C., more preferably 95° to 100° C., from the viewpoint of avoiding thermal deformation of a molded article.

The heating serves to effectively accelerate the polyaddition reaction, and the polymerization of the polyurethane foam. However, excessive heating causes discoloration (yellowing) and thermal deformation of a polyurethane foam. Therefore, in consideration of suppression of the generation of these two phenomena and improvement in operability (productivity), it is preferable that heating is carried out within a time period and at a temperature which accelerate the polymerization without discoloring or thermally deforming a polyurethane foam. For instance, when the molded article has a density of 0.6 g/cm$^3$, a preferred combination of the heating temperature and time is 100° C. for 30 to 90 minutes, 80° C. for 1 to 2 hours, or 60° C. for 3 to 4 hours.

The polyurethane foam according to the process of the present invention has an excellent compression set of 10 to 25%, preferably 10 to 20%, so that the polyurethane foam has a sufficient strength.

In particular, it is especially preferable that the polyurethane foam has a compression set of 10 to 20%, in a case where the molded article has a density of 0.6 g/cm$^3$ and a hardness of 65±2 (Asker C), a case where the molded article has a density of 0.65 g/cm$^3$ and a hardness of 67±2 (Asker C), or a case where the molded article has a density of 0.7 g/cm$^3$ and a hardness of 70±2 (Asker C), from the viewpoint of optimizing cushioning property of shoes.

Accordingly, the polyurethane foam of the present invention can be suitably used as cushioning materials for shoe soles of sports shoes.

EXAMPLES

Examples 1 to 9 and Comparative Examples 1 to 9

The components used in Examples and Comparative Examples are as follows:

[Polyol Component]

Polyol A:

A mixture prepared by mixing 40 parts of a polyester-polyol [polyethylene-1,4-butanediol adipate; number-average molecular weight: 2200; raw material: ethylene glycol/1,4-butanediol=1/0.66 (weight ratio)], with 60 parts of a polyester-polyol [polyethylene-1,4-butanediol adipate; number-average molecular weight: 1300; raw material: ethylene glycol/1,4-butanediol=1/1 (weight ratio)], with heating to a temperature of 60° C. [acid value: 0.21 KOH mg/g, hydroxyl value: 72.3 KOH mg/g, water content: 0.82% by weight]

Polyol B:

Polyether-polyol [number-average molecular weight 2000; commercially available from HODOGAYA CHEMICAL CO., LTD. under the trade name of PTG-200SNW]

Polyol C:

A mixture prepared by mixing 90 parts of a polyester-polyol [number-average molecular weight: 2200; commercially available from Kao Corporation under the trade name of EDDYFOAM E-505], with 10 parts of a polyester-polyol [number-average molecular weight: 2483; commercially available from Kao Corporation under the trade-name of EDDYFOAM E-541], with heating to a temperature of 60° C. [acid value: 0.20 KOH mg/g, hydroxyl value: 52.9 KOH mg/g, water content: 0.70% by weight]

[Polyisocyanate Compound]

Polyisocyanate Compound A:

commercially available from Kao Corporation under the trade name of EDDYFOAM B-2009

Polyisocyanate Compound B:

commercially available from Kao Corporation under the trade name of EDDYFOAM B-6106M

[Catalyst]

TEDA [1,4-diazabicyclo(2.2.2)octane]

[Blowing Agent]

Water

[Crosslinking Agent]

1,4-Butanediol (hereinafter referred to as BD)

Ethylene glycol (hereinafter referred to as EG)

[Surfactant]

Polyalkylsiloxane [commercially available from Nippon Unicar Company Limited under the trade name of SZ-1642] (hereinafter referred to as SZ-1642)

Polyalkylsiloxane [commercially available from Nippon Unicar Company Limited under the trade name of SZ-1605] (hereinafter referred to as SZ1605)

The polyol component, the catalyst, water, the crosslinking agent and the surfactant were weighed in given amounts as shown in Table 1 or 2, and the components were mixed with stirring, to give a polyol solution.

The isocyanate index showing the ratio of the polyol solution to the polyisocyanate compound was determined in accordance with the following equation:

$$[\text{Isocyanate Index}] = [\text{Amount of isocyanate actually used (parts)}] \div [\text{amount of isocyanate stoichiometrically equivalent to the amount of the polyol (parts)}] \times 100$$

Next, one of the tanks of pouring-type low-pressure blowing machine was charged with the polyol solution in an amount shown in Table 1, and the liquid temperature was adjusted to 35° to 45° C. The other tank was charged with the polyisocyanate compound, and the liquid temperature was adjusted to 35° to 40° C.

The polyol solution and the polyisocyanate compound were mixed with stirring by using the above-mentioned blowing machine, and the mixture was injected into a mold, and allowed to foam, to give a polyurethane foam having a dimension of 10 mm×300 mm×10 mm.

Next, the polyurethane foam obtained in each example was heated to a temperature of 95° to 100° C. for 1 hour in an oven.

The physical properties of the polyurethane foam were determined in accordance with the following methods. The results are shown in Tables 1 and 2.

[Molded Article Density]

The polyurethane foam having a dimension of 100 mm×300 mm×10 mm was weighed, and the molded article density was calculated by dividing the weight by its volume (300 cm$^3$).

[Hardness]

The hardness was determined by an Asker C hardness tester.

[Tensile strength, Tear Strength and Elongation]

Each of tensile strength, tear strength and elongation was determined in accordance with JIS K-6301.

[Compression Set]

The compression set is determined in accordance with ASTM D 395.

TABLE 1

| Ex. No. and Comp. Ex. No. | Ex. 1 | Comp. Ex. 1 | Ex. 2 | Comp. Ex. 2 | Ex. 3 | Comp. Ex. 3 | Ex. 4 | Comp. Ex. 4 |
|---|---|---|---|---|---|---|---|---|
| Polyol Solution | | | | | | | | |
| Kind of Polyol Component | Polyol A | | Polyol A | | Polyol A | | Polyol A | |
| Catalyst (TEDA) (parts) | 1.2 | | 1.1 | | 1.2 | | 1.1 | |
| Crosslinking Agent (parts) | BD 10.5 | | EG 5 | | BD 10.5 | | EG 5 | |
| Surfactant (SZ-1642) (parts) | 1 | | 1 | | 1 | | 1 | |
| Surfactant (SZ-1605) (parts) | 0 | | 0 | | 0 | | 0 | |
| Blowing Agent (Water) (parts) | 0.3 | | 0.3 | | 0.55 | | 0.55 | |
| Kind of Polyisocyanate Component | Polyisocyanate Compound A | | Polyisocyanate Compound A | | Polyisocyanate Compound A | | Polyisocyanate Compound A | |
| Isocyanate Index | 100 | | 100 | | 100 | | 100 | |
| Heat Treatment | ○ | x | ○ | x | ○ | x | ○ | x |
| Physical Properties | | | | | | | | |
| Density of Molded Article (g/cm³) | 0.65 | 0.65 | 0.65 | 0.65 | 0.48 | 0.49 | 0.49 | 0.48 |
| Hardness (Asker C) | 70 | 70 | 70 | 70 | 60 | 59 | 59 | 59 |
| Tensile Strength (MPa) | 7.8 | 7.1 | 8.5 | 8.1 | 4.1 | 3.9 | 4.4 | 4.1 |
| Tear Strength (KN/m) | 30.3 | 29.2 | 30.1 | 29.2 | 17.6 | 17.0 | 17.7 | 17.3 |
| Elongation (%) | 540 | 560 | 520 | 540 | 590 | 620 | 570 | 600 |
| Compression Set (%) | 19.9 | 30.8 | 19.2 | 31.4 | 21.3 | 32.4 | 22.4 | 33.9 |

(Note)
602 : heat treatment was carried out; x: heat treatment was not carried out.

TABLE 2

| Ex. No. and Comp. Ex. No. | Ex. 5 | Comp. Ex. 5 | Ex. 6 | Comp. Ex. 6 | Ex. 7 | Comp. Ex. 7 | Ex. 8 | Comp. Ex. 8 | Ex. 9 | Comp. Ex. 9 |
|---|---|---|---|---|---|---|---|---|---|---|
| Polyol Solution | | | | | | | | | | |
| Kind of Polyol Component | Polyol B | | Polyol B | | Polyol B | | Polyol B | | Polyol C | |
| Catalyst (TEDA) (parts) | 1.6 | | 1.5 | | 1.6 | | 1.5 | | 1.3 | |
| Crosslinking Agent (parts) | BD 10 | | EG 5 | | BD 10 | | EG 5 | | BD 10 | |
| Surfactant (SZ-1642) (parts) | 1 | | 1 | | 1 | | 1 | | 0 | |
| Surfactant (SZ-1605) (parts) | 0 | | 0 | | 0 | | 0 | | 1 | |
| Blowing Agent (Water) (parts) | 0.45 | | 0.45 | | 0.65 | | 0.65 | | 0.3 | |
| Kind of Polyisocyanate Component | Polyisocyanate Compound B | | Polyisocyanate Compound B | | Polyisocyanate Compound B | | Polyisocyanate Compound B | | Polyisocyanate Compound A | |
| Isocyanate Index | 100 | | 100 | | 100 | | 100 | | 100 | |
| Heat Treatment | ○ | x | ○ | x | ○ | x | ○ | x | ○ | x |
| Physical Properties | | | | | | | | | | |
| Density of Molded Article (g/cm³) | 0.65 | 0.65 | 0.65 | 0.65 | 0.48 | 0.49 | 0.49 | 0.48 | 0.60 | 0.60 |
| Hardness (Asker C) | 70 | 70 | 70 | 70 | 60 | 59 | 59 | 59 | 67 | 66 |
| Tensile Strength (MPa) | 7.2 | 6.6 | 7.5 | 6.8 | 3.8 | 3.2 | 4.0 | 3.5 | 8.4 | 7.8 |
| Tear Strength (KN/m) | 28.1 | 27.5 | 29.5 | 28.5 | 16.8 | 16.0 | 16.5 | 15.9 | 31.2 | 30.6 |
| Elongation (%) | 540 | 560 | 510 | 535 | 580 | 630 | 560 | 610 | 540 | 530 |
| Compression Set (%) | 15.2 | 26.8 | 15.6 | 28.5 | 16.8 | 28.2 | 17.5 | 29.1 | 11.4 | 25.8 |

(Note)
602 : heat treatment was carried out; x: heat treatment was not carried out.

It can be seen from the results shown in Tables 1 and 2 that the polyurethane foams obtained in Examples 1 to 9 are excellent in tensile strength, tear strength and compression set, as compared with those obtained in Comparative Examples 1 to 9, because the polyurethane foams obtained in Examples 1 to 9 are prepared from a polyol component having a specified number-average molecular weight, and the molded articles are subjected to a heat treatment at a specific temperature.

Therefore, the polyurethane foams obtained in Examples 1 to 9 are expected to be widely used for cushioning materials for shoe soles and the like.

Having explained above, the polyurethane foams obtained in the present invention can be suitably used as cushioning materials for shoe soles of sports shoes and the like since the polyurethane foams have satisfactory strength within the range of specific molded article densities.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for preparing a polyurethane foam, comprising:
    reacting a polyol having a number-average molecular weight of not less than 1000 and less than 2500 with a polyisocyanate compound in the presence of a catalyst and a blowing agent in a mold, to give a molded article having a density of 0.4 to 0.8 g/cm³, and
    heating the resulting molded article to a temperature of 60° C. to 100° C.

2. The process according to claim 1, wherein the reaction is carried out in a mold to give a molded article having a hardness of 50 to 75 (Asker C).

3. The process according to claim 1, wherein the ratio of the polyol to the polyisocyanate compound is adjusted to an isocyanate index of 90 to 110.

4. The process according to claim 1, wherein the polyol is a polyester-polyol.

5. The process according to claim 1, wherein the polyurethane foam has a compression set of 10 to 25%.

6. A polyurethane foam obtained by the process of claim 1.

7. The polyurethane foam according to claim 6, wherein the molded article is prepared in a mold, the resulting molded article is demolded from a mold, and thereafter the molded article is heated to a temperature of 60° C. to 100° C.

8. The polyurethane foam according to claim 6, wherein the compression set is 10 to 20%, in a case where the molded article has a density of 0.6 g/cm$^3$ and a hardness of 65±2 (Asker C), a case where the molded article has a density of 0.65 g/cm$^3$ and a hardness of 67±2 (Asker C), or a case where the molded article has a density of 0.7 g/cm$^3$ and a hardness of 70±2 (Asker C).

9. A cushioning material made of the polyurethane foam of any one of claims 6 to 8.

10. The cushioning material according to claim 9, wherein the cushioning material is used for shoe soles of sports shoes.

11. The process according to claim 1, where the catalyst is a tertiary amine.

* * * * *